United States Patent
Balogh et al.

(10) Patent No.: US 10,608,241 B2
(45) Date of Patent: Mar. 31, 2020

(54) METHODS OF PREPARING LITHIUM METAL ANODES

(71) Applicant: GM GLOBAL TECHNOLOGY OPERATIONS LLC, Detroit, MI (US)

(72) Inventors: Michael P. Balogh, Novi, MI (US); Hongliang Wang, Sterling Heights, MI (US); Fang Dai, Troy, MI (US); Tengjiao Qi, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 114 days.

(21) Appl. No.: 15/955,319

(22) Filed: Apr. 17, 2018

(65) Prior Publication Data

US 2019/0319259 A1 Oct. 17, 2019

(51) Int. Cl.
*H01M 4/04* (2006.01)
*H01M 4/139* (2010.01)
(Continued)

(52) U.S. Cl.
CPC ....... *H01M 4/1395* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS 7,736,805 B2 6/2010 Nazri et al.
8,101,152 B1 1/2012 Halalay et al.
(Continued)

FOREIGN PATENT DOCUMENTS

CN 107022784 A 8/2017
CN 107195857 A 9/2017
(Continued)

OTHER PUBLICATIONS

Kozen, Alexander C. et al.; "Next-Generation Lithium Metal Anode Engineering Via Atomic Layer Deposition"; ACS Nano; vol. 9; No. 6; May 13, 2015; pp. 5884-5892.
(Continued)

*Primary Examiner* — Yoshitoshi Takeuchi
(74) *Attorney, Agent, or Firm* — Harness, Dickey & Pierce, P.L.C.

(57) ABSTRACT

A lithium-based electrode assembly and methods of formation relating thereto are provided. The lithium-based electrode assembly comprises a metal current collector, an electrode comprising lithium metal, and an intermediate layer disposed therebetween. The intermediate layer comprising an intermetallic compound comprising the lithium metal of the electrode and a metal selected from the group consisting of: aluminum, silver, gold, barium, bismuth, boron, calcium, cadmium, carbon, gallium, germanium, mercury, indium, iridium, lead, palladium, platinum, rhodium, antimony, selenium, silicon, tin, strontium, sulfur, tellurium, zinc, and combinations thereof. The method of forming the lithium assembly includes coating a surface of the metal current collector with the intermediate layer; disposing the electrode onto an exposed surface of the intermediate layer; and heating the electrode, the intermediate layer, and the metal current collector to form the lithium intermetallic compound, which joins the metal current collector and the electrode together.

10 Claims, 2 Drawing Sheets

(51) Int. Cl.
| | |
|---|---|
| *H01M 4/1395* | (2010.01) |
| *H01M 4/134* | (2010.01) |
| *H01M 4/40* | (2006.01) |
| *H01M 4/66* | (2006.01) |

(52) U.S. Cl.
CPC .......... *H01M 4/134* (2013.01); *H01M 4/405* (2013.01); *H01M 4/661* (2013.01)

(56) References Cited

U.S. PATENT DOCUMENTS

| | | | |
|---|---|---|---|
| 8,119,288 | B2 | 2/2012 | Zhamu et al. |
| 8,399,138 | B2 | 3/2013 | Timmons |
| 8,420,259 | B2 | 4/2013 | Xiao et al. |
| 8,440,350 | B1 | 5/2013 | Verbrugge et al. |
| 8,642,201 | B2 | 2/2014 | Cheng et al. |
| 8,658,295 | B2 | 2/2014 | Cheng et al. |
| 8,679,680 | B2 | 3/2014 | Vanimisetti et al. |
| 8,828,481 | B2 | 9/2014 | Burton et al. |
| 8,835,056 | B2 | 9/2014 | Xiao et al. |
| 8,927,149 | B2 | 1/2015 | Ohara et al. |
| 8,945,772 | B2 | 2/2015 | Kawakami et al. |
| 8,974,946 | B2 | 3/2015 | Cai et al. |
| 9,012,075 | B2 | 4/2015 | Verbrugge et al. |
| 9,034,519 | B2 | 5/2015 | Xiao et al. |
| 9,093,705 | B2 | 7/2015 | Xiao et al. |
| 9,129,754 | B2 | 9/2015 | Kuriki et al. |
| 9,142,830 | B2 | 9/2015 | Xiao et al. |
| 9,153,819 | B2 | 10/2015 | Huang et al. |
| 9,160,036 | B2 | 10/2015 | Yang et al. |
| 9,252,411 | B2 | 2/2016 | Elhamid et al. |
| 9,356,281 | B2 | 5/2016 | Verbrugge et al. |
| 9,362,551 | B2 | 6/2016 | Sachdev et al. |
| 9,362,552 | B2 | 6/2016 | Sohn et al. |
| 9,373,829 | B2 | 6/2016 | Xiao et al. |
| 9,373,834 | B2 | 6/2016 | Yamakaji et al. |
| 9,379,374 | B2 | 6/2016 | Liu et al. |
| 9,490,472 | B2 | 11/2016 | Nanba et al. |
| 9,583,767 | B2 | 2/2017 | Verbrugge et al. |
| 9,647,254 | B2 | 5/2017 | Dadheech et al. |
| 9,742,028 | B2 | 8/2017 | Zhou et al. |
| 9,923,189 | B2 | 3/2018 | Xiao |
| 9,929,435 | B2 | 3/2018 | Cai et al. |
| 2011/0159364 | A1 | 6/2011 | Nishinaka et al. |
| 2012/0094178 | A1 | 4/2012 | Loveridge et al. |
| 2012/0100403 | A1 | 4/2012 | Wang et al. |
| 2012/0229096 | A1 | 9/2012 | Nazri |
| 2012/0328927 | A1 | 12/2012 | Timmons et al. |
| 2013/0099159 | A1 | 4/2013 | Halalay et al. |
| 2013/0260236 | A1 | 10/2013 | Park et al. |
| 2015/0056387 | A1 | 2/2015 | Dadheech et al. |
| 2015/0056493 | A1 | 2/2015 | Dadheech et al. |
| 2015/0166348 | A1 | 6/2015 | Ikenuma et al. |
| 2015/0236324 | A1 | 8/2015 | Xiao et al. |
| 2015/0280221 | A1 | 10/2015 | Abdelsalam et al. |
| 2015/0349307 | A1 | 12/2015 | Dadheech et al. |
| 2016/0020491 | A1 | 1/2016 | Dai et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |
| 2016/0172706 | A1 | 6/2016 | Xiao et al. |
| 2016/0172710 | A1 | 6/2016 | Liu et al. |
| 2016/0218342 | A1 | 7/2016 | Xiao et al. |
| 2016/0218387 | A1 | 7/2016 | Tajima |
| 2016/0254567 | A1 | 9/2016 | Cai et al. |
| 2017/0047588 | A1 | 2/2017 | Mukherjee et al. |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0338490 | A1 | 11/2017 | Xiao et al. |
| 2018/0048022 | A1 | 2/2018 | Yang et al. |
| 2018/0062206 | A1 | 3/2018 | Yang et al. |
| 2018/0108952 | A1 | 4/2018 | Yang et al. |
| 2018/0309166 | A1 | 10/2018 | Yersak et al. |
| 2018/0375148 | A1 | 12/2018 | Yersak et al. |
| 2019/0044134 | A1 | 2/2019 | Liu et al. |
| 2019/0058210 | A1 | 2/2019 | Dai et al. |
| 2019/0058211 | A1 | 2/2019 | Yang et al. |
| 2019/0067675 | A1 | 2/2019 | Xiao |
| 2019/0067744 | A1 | 2/2019 | Xiao et al. |
| 2019/0089006 | A1 | 3/2019 | Yang et al. |
| 2019/0237758 | A1 | 8/2019 | Dadheech et al. |
| 2019/0312255 | A1 | 10/2019 | Dai et al. |

FOREIGN PATENT DOCUMENTS

| | | |
|---|---|---|
| CN | 110112368 A | 8/2019 |
| CN | 110391399 A | 10/2019 |
| DE | 102017101740 A1 | 8/2017 |
| DE | 102017105307 A1 | 9/2017 |
| DE | 102019102037 A1 | 8/2019 |
| DE | 102019109376 A1 | 10/2019 |
| WO | WO-2015176241 A1 | 11/2015 |

OTHER PUBLICATIONS

Yan, Kai et al.; "Selective deposition and stable encapsulation of lithium through heterogeneous seeded growth", Nature Energy, vol. 1, 2016, 8 pages.

Li Yang et al.; U.S. Appl. No. 15/295,600, filed Oct. 17, 2016 entitled "Three-Electrode Test Cell"; 33 pages.

Fang Liu et al.; U.S. Appl. No. 15/666,170, filed Aug. 1, 2017 entitled "Conformal Coating of Lithium Anode Via Vapor Deposition for Rechargeable Lithium Ion Batteries"; 52 pages.

Li Yang et al.; U.S. Appl. No. 15/677,249, filed Aug. 15, 2017 entitled "Ether-Based Electrolyte System Improving or Supporting Anodic Stability of Electrochemical Cells Having Lithium-Containing Anodes"; 44 pages.

Fang Dai et al.; U.S. Appl. No. 15/677,760, filed Aug. 15, 2017 entitled "Lithium Metal Battery With Hybrid Electrolyte System"; 48 pages.

Xingcheng Xiao; U.S. Appl. No. 15/692,107, filed Aug. 31, 2017 entitled "Methods of Applying Self-Forming Artificial Solid Electrolyte Interface (SEI) Layer to Stabilize Cycle Stability of Electrodes in Lithium Batteries"; 45 pages.

Li Yang et al.; U.S. Appl. No. 15/710,326, filed Sep. 20, 2017 entitled "Hybrid Metal-Organic Framework Separators for Electrochemical Cells"; 46 pages.

Gayatri V. Dadheech et al.; U.S. Appl. No. 15/886,396, filed Feb. 1, 2018 entitled "Plasma Treatment on Current Collectors for Thin Film Lithium Metallization"; 41 pages.

METHODS OF PREPARING LITHIUM METAL ANODES

INTRODUCTION

This section provides background information related to the present disclosure which is not necessarily prior art.

The present disclosure relates to lithium-based electrode assemblies and formation methods relating thereto. A lithium-based electrode assembly includes a metal current collector, a lithium-metal electrode, and an intermediate layer disposed therebetween, where the intermediate layer comprises an intermetallic compound.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion and lithium-sulfur batteries include a first electrode, a second electrode, an electrolyte material, and a separator. One electrode serves as a positive electrode or cathode (on discharge) and another serves as a negative electrode or anode (on discharge). A stack of battery cells may be electrically connected to increase overall output. Conventional rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. Common negative electrode materials include lithium insertion materials or alloy host materials, like carbon-based materials, such as lithium-graphite intercalation compounds, or lithium-silicon compounds, lithium-tin alloys, and lithium titanate (LTO) (e.g., $Li_{4+x}Ti_5O_{12}$, where $0 \leq x \leq 3$, such as $Li_4Ti_5O_{12}$). The negative electrode may also be made of metallic lithium (often referred to as a lithium metal anode (LMA)), so that the electrochemical cell is considered a lithium metal battery or cell. Use of metallic lithium in the negative electrode of a rechargeable battery has various potential advantages, including having the highest theoretical capacity and lowest electrochemical potential. Thus, batteries incorporating lithium metal anodes can have a higher energy density potentially doubling storage capacity and halving the size of the battery, while maintaining a similar cycle life as other lithium ion batteries. Lithium metal batteries are thus one of the most promising candidates for high energy storage systems.

However, lithium metal batteries also have potential downsides in some instances. For example, the comparatively high level of reactivity of the lithium metal may result in interfacial instability and undesired side reactions. Side reactions may occur between the lithium metal and various species the lithium metal may be exposed to during manufacture and/or operation of the electrochemical cell. Such side reactions may promote unfavorable dendrite formation. Another potential source of diminished performance in lithium metal batteries may result from weak long-term adhesion of the lithium metal to a metal current collector of the negative electrode. In some instances, the weak long-term adhesion may result in undesirable increases in resistance and impedance during cell cycling.

Accordingly, it would be desirable to develop reliable, high-performance lithium-containing negative electrode materials for use in high energy electrochemical cells, and methods relating thereto, that minimize undesirable side reactions, and ensure or improve long-term adhesion between the lithium metal and the metal current collector.

SUMMARY

This section provides a general summary of the disclosure, and is not a comprehensive disclosure of its full scope or all of its features.

In various aspects, the present disclosure provides a method of forming a lithium-based electrode assembly. The method may include coating a surface of a metal current collector with an intermediate layer; disposing an electrode comprising lithium metal onto an exposed surface of the intermediate layer; and forming a lithium intermetallic compound including lithium metal from the electrode and the metal of the intermediate layer. The intermediate layer may include a metal selected from the group consisting of: silver (Ag), aluminum (Al), gold (Au), barium (Ba), bismuth (Bi), boron (B), calcium (Ca), cadmium (Cd), carbon (C), gallium (Ga), germanium (Ge), mercury (Hg), indium (In), iridium (Ir), lead (Pb), palladium (Pd), platinum (Pt), rhodium (Rh), antimony (Sb), selenium (Se), silicon (Si), tin (Sn), strontium (Sr), sulfur (S), tellurium (Te), zinc (Zn), and combinations thereof.

In one aspect, forming of the lithium intermetallic compound may include applying heat to the electrode and the intermediate layer.

In one aspect, the applied heat may be from about 100° C. to about 300° C., and the heat may be applied for a time ranging from about 1 minute to about 15 minutes.

In one aspect, forming of the lithium intermetallic compound may include applying pressure to the electrode, the intermediate layer, and the metal current collector.

In one aspect, the applied pressure ranges from about 0.1 MPa to about 0.6 MPa, and the pressure may be applied for a time ranging from about 1 minute to about 15 minutes.

In one aspect, the metal current collector may be selected from the group consisting of: copper (Cu), nickel (Ni), iron (Fe), titanium (Ti), chromium (Cr), and combinations thereof and the metal current collector may have a thickness ranging from about 1 µm to about 25 µm.

In one aspect, the intermediate layer may have a thickness less than about 1 µm.

In one aspect, coating the surface of the metal current collector with the intermediate layer may include depositing the metal of the intermediate layer on the surface of the current collector using a coating method selected from the group consisting of: electroplating, sputter coating, vacuum metallization, plasma vapor deposition, chemical vapor deposition, and combinations thereof.

In one aspect, the electrode may have a thickness ranging from about 1 µm to about 20 µm.

In one aspect, disposing the electrode onto the exposed surface of the intermediate layer may include contacting the electrode to the surface of the intermediate layer using a joining method selected from the group consisting of: lamination, thermal bonding, hot dipping, spot welding, laser welding, ultrasonic welding, and combinations thereof.

In various aspects, the present disclosure provides a method of forming a lithium-based electrode assembly. The method may include forming an intermediate layer on a surface of a metal current collector; contacting an electrode including lithium metal and an exposed surface of the intermediate layer; and heating the electrode and the intermediate layer to form a lithium intermetallic compound. The lithium intermetallic compound includes lithium metal from the electrode and the metal of the intermediate layer. The intermediate layer may include a metal selected from the group consisting of: silver (Ag), aluminum (Al), tin (Sn), zinc (Zn), and combinations thereof, and the metal current collector is selected from the group consisting of: copper (Cu), nickel (Ni), iron (Fe), titanium (Ti), and combinations thereof.

In one aspect, the electrode and the intermediate layer may be heated at a temperature ranging from about 100° C. to about 300° C. for a time ranging from about 1 minute to about 15 minutes.

In one aspect, forming the lithium intermetallic compound may include applying pressure to the electrode, the intermediate layer, and the metal current collector. The applied pressure may range from about 0.1 MPa to about 0.6 MPa and the pressure may be applied for a time ranging from about 1 minute to about 15 minutes.

In one aspect, the electrode and the intermediate layer may be heated at a temperature ranging from about 140° C. to about 180° C.

In one aspect, forming the intermediate layer on the surface of the metal current collector includes depositing the metal on the surface of the current collector using a coating method selected from the group consisting of: electroplating, sputter coating, vacuum metallization, plasma vapor deposition, chemical vapor deposition, and combinations thereof.

In one aspect, contacting the electrode and the exposed surface of the intermediate layer includes bonding the electrode to the surface of the intermediate layer using a joining method selected from the group consisting of: lamination, thermal bonding, hot dipping, spot welding, laser welding, ultrasonic welding, and combinations thereof.

In yet other aspects, the present disclosure provides a lithium-based electrode assembly including a metal current collector, an electrode comprising lithium metal, and an intermediate layer disposed therebetween. The intermediate layer includes an intermetallic compound comprising the lithium metal of the electrode and a metal selected from the group consisting of: silver (Ag), aluminum (Al), gold (Au), barium (Ba), bismuth (Bi), boron (B), calcium (Ca), cadmium (Cd), carbon (C), gallium (Ga), germanium (Ge), mercury (Hg), indium (In), iridium (Ir), lead (Pb), palladium (Pd), platinum (Pt), rhodium (Rh), antimony (Sb), selenium (Se), silicon (Si), tin (Sn), strontium (Sr), sulfur (S), tellurium (Te), zinc (Zn), and combinations thereof.

In one aspect, the metal current collector may have a thickness ranging from about 1 μm to about 25 μm, the intermediate layer may have a thickness less than about 1 μm, and the electrode may have a thickness ranging from about 1 μm to about 20 μm.

In one aspect, the metal may be silver (Ag) and the lithium intermetallic compound may be $Li_4Ag$.

In one aspect, the metal may be zinc (Zn) and the lithium intermetallic compound may be $LiZn$.

In one aspect, the metal may be aluminum (Al) and the lithium intermetallic compound may be $Li_9Al_4$.

In one aspect, the metal may be tin (Sn) and the lithium intermetallic compound may be $Li_{17}Sn_4$.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A illustrates a conventionally formed lithium-based electrode assembly, and FIG. 2B illustrates a lithium-based electrode assembly formed in accordance with certain aspects of the present disclosure.

Corresponding reference numerals indicate corresponding parts throughout the several views of the drawings.

DETAILED DESCRIPTION

Figure 1:
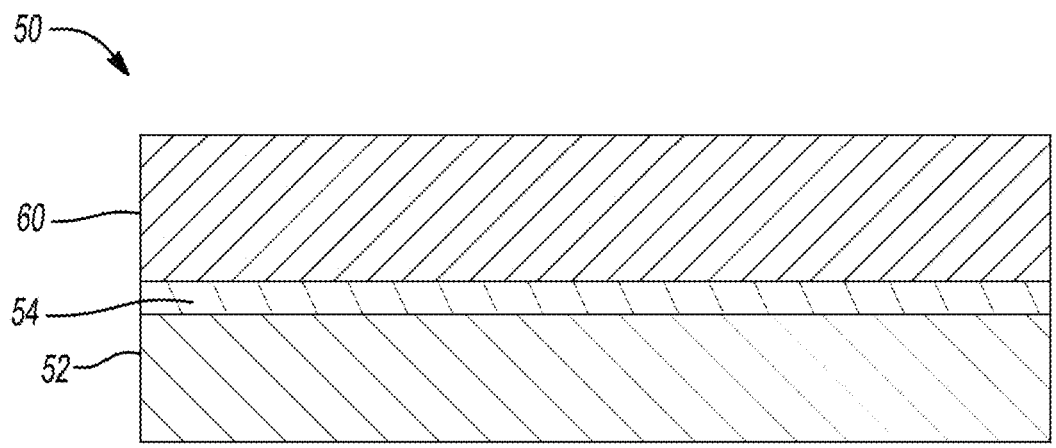
FIG. 1 shows a sectional view of an example of a lithium-based electrode assembly formed in accordance with certain aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology contemplates an electrode assembly for an electrochemical cell. An electrochemical cell may include a battery, capacitor, or super capacitor, by way of example. Suitable batteries may include lithium-ion, lithium sulfur, and lithium-lithium symmetrical batteries. High-energy density, electrochemical cells, such as lithium-based batteries, can be used in a variety of consumer products. In various instances, such electrochemical cells are used in vehicle applications. However, the present technology may also be employed in a wide variety of other applications. For example, devices in which such electrochemical cells may be used include an electric motor for a hybrid vehicle or an all-electrical vehicle, a laptop computer, a tablet computer, a cellular phone, and cordless power tools or appliances.

In various aspects, the present disclosure provides a lithium-based electrode assembly and methods of formation related thereto. The lithium-based electrode assembly includes a coated metal current collector and an electroactive lithium-metal layer disposed on the coated surface of the metal current collector. The metal in the metal current collector is optionally selected from the group consisting of: copper (Cu), nickel (Ni), iron (Fe), titanium (Ti), chromium (Cr), molybdenum (Mo), and combinations thereof. For example, the current collector may be formed of an iron alloy, such as stainless steel. Copper and nickel are particularly challenging metal substrates on which to form a lithium-metal layer, as such metals typically do not react with lithium at room temperature and have substantial nucleation overpotential. Furthermore, these metals have a propensity to form metal oxides that can potentially further inhibit the formation of an even layer of lithium metal with good adhesion with the metal current collector. Current techniques for forming lithium-metal layers on such metals current collectors often involve treating the collectors with strong solvents (e.g., toluene or acetone) and acids (e.g., sulfuric acids). Such techniques commonly involve multiple, laborious processing steps, and even after treatment, a substantial amount of metal oxide may still remain on the surface of the treated current collector, diminishing the wettability of the lithium metal on the surface of the current collector and negatively impacting the adhesion strength between the lithium metal and the current collector. If the bond between the lithium metal and current collector is not robust, resistance and impedance of the electrode will increase over time. The lithium-based electrode assembly formed in accordance with various aspects of the present disclosure has improved adhesion between the lithium-metal layer and the metal current collector.

An example lithium-based electrode assembly 50 formed in accordance with certain methods of the present disclosure as discussed below is shown in FIG. 1. The lithium-based electrode assembly 50 includes a metal current collector 52 substantially parallel with a lithium-metal layer or source 60 and an intermediate layer 54 disposed therebetween bonding the metal current collector 52 and the lithium-metal layer 60. The intermediate layer 54 includes a lithium intermetallic compound as described below. The lithium intermetallic compound joins the lithium-metal layer 60 and the metal current collector 52 to form the lithium-based electrode assembly 50. In certain aspects, the lithium-based electrode assembly 50 may be a lithium-based negative electrode.

In certain variations, the metal current collector 52 is a film or foil having a thickness ranging from about 1 µm to about 25 µm, and in certain aspects, optionally from about 5 µm to about 10 µm. The lithium-metal layer 60 may be a lithium film or foil and may have an applied thickness ranging from about 1 µm to about 20 µm, and in certain aspects, optionally from about 2 µm to about 10 µm. As the skilled artisan will appreciate, the thickness of the lithium-metal layer 60 may increase during cycling of an electrochemical cell including the lithium-based electrode assembly 50. For example, as lithium present in the electrochemical cell may be plated onto the lithium-metal layer 60. Thus, the lithium-metal layer 60 may provide a thin initiator layer or strike-plate layer that promotes subsequent growth of lithium that may migrate from the electroactive material of the cojoined electrode or electrolyte system. While the thickness of the intermediate layer 54 will depend on the disposition method, as highlighted below, in various instances, the intermediate layer 54 may have a thickness ranging from about 0.01 µm to about 5 µm, and in certain aspects, optionally from about 0.02 µm to about 1 µm.

The metal current collector 52 may comprise a metal selected from the group consisting of: copper (Cu), nickel (Ni), iron (Fe), titanium (Ti), chromium (Cr), and combinations thereof. The intermediate layer 54 includes a lithium intermetallic compound comprising lithium metal from the lithium-metal layer 60 and a metal selected from the group consisting of: silver (Ag), aluminum (Al), gold (Au), barium (Ba), bismuth (Bi), boron (B), calcium (Ca), cadmium (Cd), carbon (C), gallium (Ga), germanium (Ge), mercury (Hg), indium (In), iridium (Ir), lead (Pb), palladium (Pd), platinum (Pt), rhodium (Rh), antimony (Sb), selenium (Se), silicon (Si), tin (Sn), strontium (Sr), sulfur (S), tellurium (Te), zinc (Zn), and combinations thereof. For example, in various instances, the intermediate layer 54 may comprise a lithium intermetallic compound selected from the group consisting of: $Li_4Ag$, $Li_9Al_4$, $Li_{15}Au_4$, $Li_4Ba$, $Li_3Bi$, $LiB$, $Li_2Ca$, $Li_3Cd$, $Li_2C_2$, $Li_2Ga$, $Li_{17}Ge_4$, $Li_6Hg$, $Li_7In$, $LiIr$, $Li_{17}Pb_4$, $Li_5Pd$, $Li_5Pt$, $LiRh$, $Li_3Sb$, $Li_2Se$, $Li_{21}Si_5$, $Li_{17}Sn_4$, $Li_{23}Sr_6$, $Li_2S$, $Li_2Te$, $LiZn$, and combinations thereof. Certain metals may be omitted or not elected because of potential health risks and/or expense. For example, in certain aspects, the intermediate layer may optionally comprise a metal selected from the group consisting of: silver (Ag), aluminum (Al), tin (Sn), zinc (Zn), and combinations thereof; and the lithium intermetallic compound may optionally be one of $Li_4Ag$, $Li_9Al_4$, $Li_{17}Sn_4$, and $LiZn$.

There is improved adhesion between the lithium-metal layer and the metal current collector. For example, as seen in FIGS. 2A-2B, upon a peel test, conventional lithium-based electrode assemblies—for example, lithium-based electrode assembly 70—experience complete adhesion failure, while lithium-based electrode assemblies prepared in accordance with certain limitations of the present disclosure—for example, lithium-based electrode assembly 90—have excellent adhesion and experience instead more favorable cohesive failure.

Figure 2A:
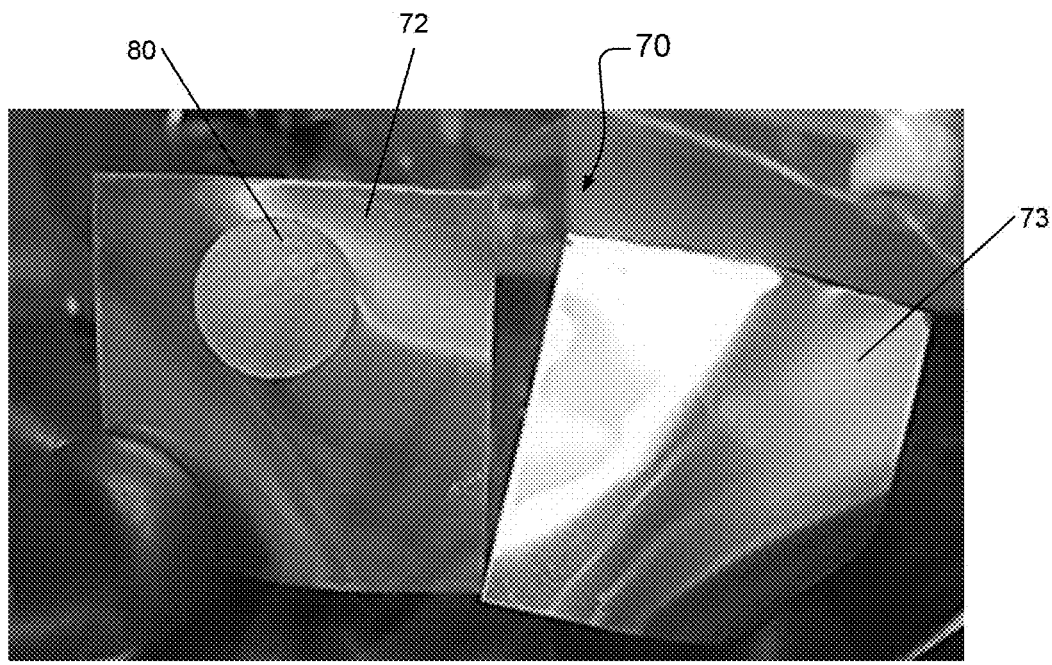
FIGS. 2A and 2B are peel-strength illustrations.

The conventional lithium-based electrode assembly 70 illustrated in FIG. 2A includes a lithium metal layer 80 initially disposed between a first metal current collector 72 and a second metal current collector 73. However, as illustrated, when the layers were peeled there was an adhesion failure and the lithium metal layer 80 transferred completely with the first metal current collector 72.

Figure 2B:
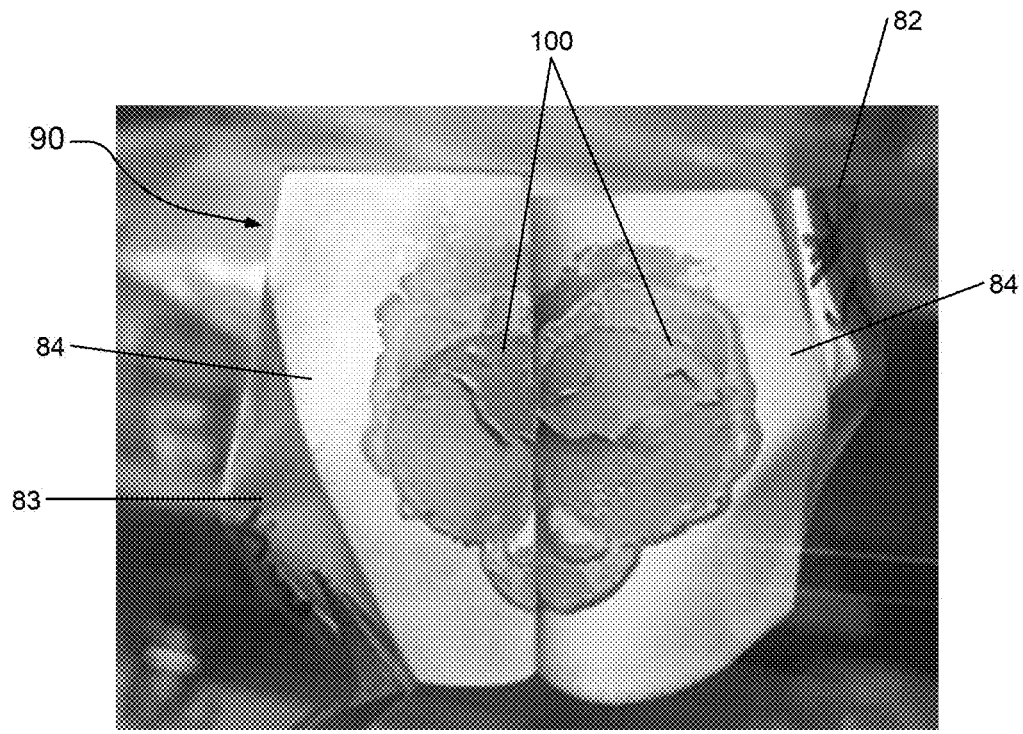

The lithium-based electrode assembly 90 prepared in accordance with various aspects of the present disclosure illustrated in FIG. 2B includes a lithium metal layer 100 initially disposed between a first coated metal current collector 82 and a second coated metal current collector 83. The first and second coated metal current collectors 82, 83 are each coated with an intermediate layer 84 including an intermetallic compound comprising lithium metal from the lithium-metal layer 100 and a metal selected from the group consisting of: silver (Ag), aluminum (Al), gold (Au), barium (Ba), bismuth (Bi), boron (B), calcium (Ca), cadmium (Cd), carbon (C), gallium (Ga), germanium (Ge), mercury (Hg), indium (In), iridium (Ir), lead (Pb), palladium (Pd), platinum (Pt), rhodium (Rh), antimony (Sb), selenium (Se), silicon (Si), tin (Sn), strontium (Sr), sulfur (S), tellurium (Te), zinc (Zn), and combinations thereof. As illustrated, when the layers were peeled there existed excellent adhesion, the lithium-based electrode assembly 90 instead experienced cohesive failure of the lithium metal layer 100 itself.

In various aspects, the present disclosure provides a method of forming a lithium-based electrode assembly comprising a metal current collector, an electrode comprising lithium metal, and an intermediate layer including an intermetallic compound disposed therebetween. The method includes coating a surface of a metal current collector with an intermediate layer. In certain aspects, coating the surface of the metal current collector with the intermediate layer may include depositing the metal of the intermediate layer on the surface of the current collector using a coating method selected from the group consisting of: electroplating, sputter coating, vacuum metallization, plasma vapor deposition, chemical vapor deposition, and combinations thereof. The thickness of the intermediate layer may vary depending on the selected coating method. For example, an intermediate layer deposited on the surface of the current collector using an electroplating method may have a thickness ranging from about 0.02 µm to about 5 µm, and in certain aspects, optionally about 0.2 µm. An intermediate layer deposited on the surface of the current collector using a sputter coating method may have a thickness ranging about 10 nm to about 100 nm, and in certain aspects, optionally about 16 nm.

The method further includes disposing an electrode comprising a lithium metal on an exposed surface of the intermediate layer coated on the metal current collector. In certain aspects, disposing the electrode onto the exposed surface of the intermediate layer comprises contacting the electrode to the surface of the intermediate layer using a joining method selected from the group consisting of: lamination, thermal bonding, hot dipping, spot welding, laser welding, ultrasonic welding, and combinations thereof.

In various aspects, the electrode may be cleaned prior to being applied to or disposed on the coated metal current collector. Lithium metal is a comparatively soft metal and highly reactive, especially with oxidizing species. Consequently, blasting the electrode with loose, hard abrasives may not be suitable for cleaning the lithium-metal layer. Further, in view of the high reactivity of lithium metals, it may also be appropriate to avoid the use of protic solvents (e.g., alcohols, acetone, ethers, and the like) when cleaning. Suitable cleaning processes may, therefore, include wiping the lithium-metal layer with an aprotic solvent (e.g., hexane), or other cleaning comparatively gentle cleaning techniques that undesirably react with the lithium metal.

After the electrode is disposed, a lithium intermetallic compound comprising lithium metal from the electrode and the metal of the intermediate layer may be formed. The intermediate layer may comprise a metal selected from the group consisting of: silver (Ag), aluminum (Al), gold (Au), barium (Ba), bismuth (Bi), boron (B), calcium (Ca), cadmium (Cd), carbon (C), gallium (Ga), germanium (Ge), mercury (Hg), indium (In), iridium (Ir), lead (Pb), palladium (Pd), platinum (Pt), rhodium (Rh), antimony (Sb), selenium (Se), silicon (Si), tin (Sn), strontium (Sr), sulfur (S), tellurium (Te), zinc (Zn), and combinations thereof and the formed lithium intermetallic compound may be one of $Li_4Ag$, $Li_9Al_4$, $Li_{15}Au_4$, $Li_4Ba$, $Li_3Bi$, $LiB$, $Li_2Ca$, $Li_3Cd$, $Li_2C_2$, $Li_2Ga$, $Li_{17}Ge_4$, $Li_6Hg$, $Li_7In$, $LiIr$, $Li_{17}Pb_4$, $Li_5Pd$, $Li_5Pt$, $LiRh$, $Li_3Sb$, $Li_2Se$, $Li_{21}Si_5$, $Li_{17}Sn_4$, $Li_{23}Sr_6$, $Li_2S$, $Li_2Te$, $LiZn$, and combinations thereof. A negligible amount of the lithium metal of the electrode is consumed to form the lithium intermetallic compound. For example, the following table provides example intermetallic compounds and corresponding thicknesses.

| | | THICKNESSES | |
|---|---|---|---|
| Example No. | Intermetallic Compound | Thickness of the Disposed Electrode | Thickness of Consumed Lithium Metal |
| 1 | $Li_4Ag$ | 16 nm | 0.08 µm |
| | | 100 nm | 0.5 µm |
| | | 1 µm | 5 µm |
| 2 | $Li_9Al_4$ | 16 nm | 0.5 µm |
| | | 100 nm | 0.3 µm |
| | | 1 µm | 3 µm |
| 3 | $Li_{15}Au_4$ | 16 nm | 0.08 µm |
| | | 100 nm | 0.5 µm |
| | | 1 µm | 5 µm |
| 4 | $Li_{17}Sn_4$ | 16 nm | 0.05 µm |
| | | 100 nm | 0.3 µm |
| | | 1 µm | 3 µm |
| 5 | $LiZn$ | 16 nm | 0.02 µm |
| | | 100 nm | 0.14 µm |
| | | 1 µm | 1.4 µm |

In various aspects, forming the lithium intermetallic compound may include applying heat to the electrode and the intermediate layer. Heating may facilitate formation of the lithium intermetallic compound and thereby bonding between the electrode and the metal current collector. While suitable heating temperatures and conditions depend on the materials used, in various instances, the applied heat may range from about 100° C. to about 300° C., and in certain aspects, optionally from about 140° C. to about 180° C. The heat may be applied for a time ranging from about 1 minute to about 15 minutes.

In certain aspects, the intermetallic compound may be formed by heating the electrode and the intermediate layer to one of a eutectic temperature and a peritectic temperature of the desired intermetallic compound. For example, the following table provides example intermetallic compounds and corresponding heating temperatures.

| Intermediate Layer | Intermetallic Compound | Heating Temperature |
|---|---|---|
| Sr | $Li_{23}Sr_6$ | 134 |
| Ca | $Li_2Ca$ | 141 |
| Ba | $Li_4Ba$ | 143 |
| Pd | $Li_5Pd$ | 145 |
| Ag | $Li_4Ag$ | 146 |
| Au | $Li_{15}Au_4$ | 155 |
| Hg | $Li_6Hg$ | 161 |
| Zn | $LiZn$ | 162 |
| Ga | $Li_2Ga$ | 167 |
| Pt | $Li_5Pt$ | 169 |
| Bi | $Li_3Bi$ | 175 |
| C | $Li_2C_2$ | 175 |

-continued

| Intermediate Layer | Intermetallic Compound | Heating Temperature |
|---|---|---|
| Sb | $Li_3Sb$ | 176 |
| Pb | $Li_{17}Pb_4$ | 177 |
| Al | $Li_9Al_4$ | 179 |
| In | $Li_7In$ | 179 |
| Sn | $Li_{17}Sn_4$ | 179 |
| Ir | $LiIr$ | 180 |
| Rh | $LiRh$ | 180 |
| S | $Li_2S$ | 180 |
| Te | $Li_2Te$ | 180 |
| Se | $Li_2Se$ | 181 |
| Si | $Li_{21}Si_5$ | 181 |
| B | $LiB$ | 181 |
| Ge | $Li_{17}Ge_4$ | 181 |

In certain aspects, forming the intermetallic compound may further include applying pressure to the electrode, the intermediate layer, and/or the metal current collector. The applied pressure may compress the layers together and assist the bonding and/or adhesion of the metal current collector and the electrode. In various instances, the pressure may be applied using rollers, platens, blades, and/or related methods. The applied pressure may range from about 0.1 MPa to about 5 MPa, and in certain aspects, optionally from about 0.1 MPa to about 1 MPa. The pressure may be applied to the metal current collector and/or the lithium-metal layer for a time ranging from about 1 minute to about 15 minutes, and in certain aspects, optionally from about 1 minute to about 10 minutes. In certain aspects, the heat and the pressure may be applied simultaneously.

In various aspects, one or more of the method steps may be performed in an inert environment (e.g., argon (Ar)) and/or vacuum. For example, the applying or disposing of the electrode onto the coated surface of the metal current collector and/or the heating of the electrode and the intermediate layer may occur in an inert environment and/or vacuum eliminating or minimizing lithium metal side reactions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a lithium-based electrode assembly, the method comprising:
    coating a surface of a metal current collector with an intermediate layer comprising a metal selected from the group consisting of: silver (Ag), aluminum (Al), gold (Au), barium (Ba), bismuth (Bi), boron (B), calcium (Ca), cadmium (Cd), carbon (C), gallium (Ga), germanium (Ge), mercury (Hg), indium (In), iridium (Ir), lead (Pb), palladium (Pd), platinum (Pt), rhodium (Rh), antimony (Sb), selenium (Se), silicon (Si), tin (Sn), strontium (Sr), sulfur (S), tellurium (Te), zinc (Zn), and combinations thereof;
    disposing an electrode comprising lithium metal onto an exposed surface of the intermediate layer; and forming a lithium intermetallic compound comprising lithium metal from the electrode and the metal of the intermediate layer.

2. The method of claim 1, wherein the forming comprises applying heat to the electrode and the intermediate layer.

3. The method of claim 2, wherein the applied heat is from about 100° C. to about 300° C. and the heat is applied for a time ranging from about 1 minute to about 15 minutes.

4. The method of claim 2, wherein the forming further comprises applying pressure to the electrode, the intermediate layer, and the metal current collector.

5. The method of claim 4, wherein the applied pressure ranges from about 0.1 MPa to about 0.6 MPa and the pressure is applied for a time ranging from about 1 minute to about 15 minutes.

6. The method of claim 1, wherein the metal current collector is selected from the group consisting of: copper (Cu), nickel (Ni), iron (Fe), titanium (Ti), chromium (Cr), and combinations thereof; and the metal current collector has a thickness ranging from about 1 μm to about 25 μm.

7. The method of claim 6, wherein the intermediate layer has a thickness less than about 1 μm.

8. The method of claim 7, wherein coating the surface of the metal current collector with the intermediate layer comprises depositing the metal of the intermediate layer on the surface of the current collector using a coating method selected from the group consisting of: electroplating, sputter coating, vacuum metallization, plasma vapor deposition, chemical vapor deposition, and combinations thereof.

9. The method of claim 7, wherein the electrode has a thickness ranging from about 1 μm to about 20 μm.

10. The method of claim 9, wherein disposing the electrode onto the exposed surface of the intermediate layer comprises contacting the electrode to the surface of the intermediate layer using a joining method selected from the group consisting of: lamination, thermal bonding, hot dipping, spot welding, laser welding, ultrasonic welding, and combinations thereof.

* * * * *